April 21, 1936.   C. G. CURTIS   2,038,271
TWO-CYCLE INTERNAL COMBUSTION ENGINE
Filed March 3, 1933   2 Sheets-Sheet 1
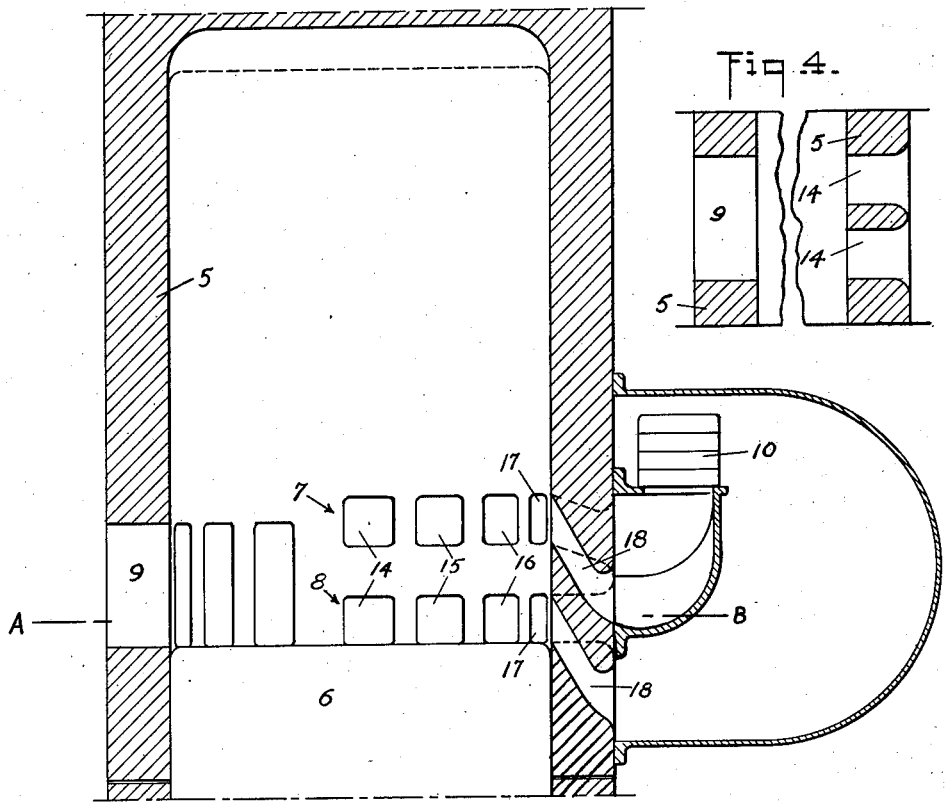
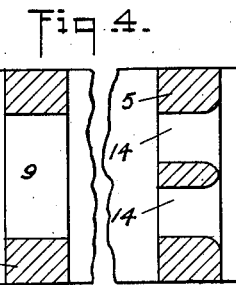
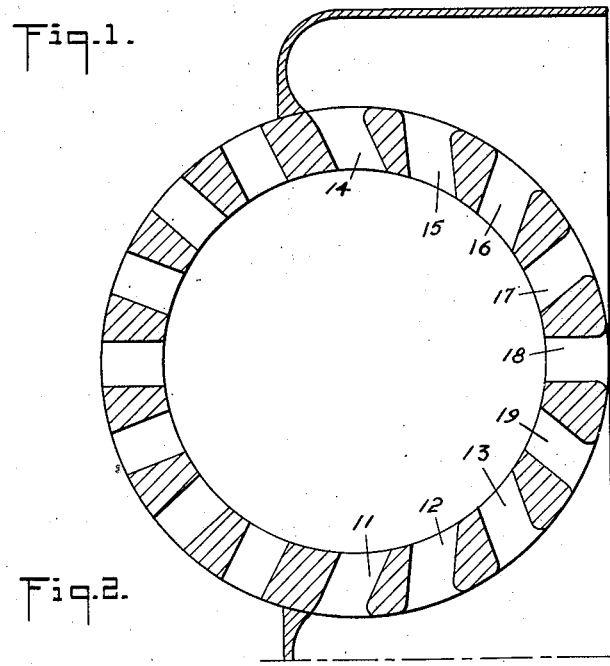
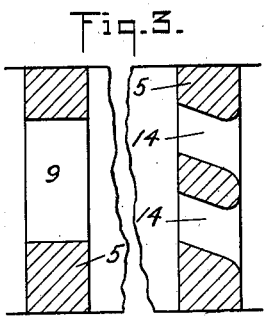

April 21, 1936.  C. G. CURTIS  2,038,271
TWO-CYCLE INTERNAL COMBUSTION ENGINE
Filed March 3, 1933  2 Sheets-Sheet 2
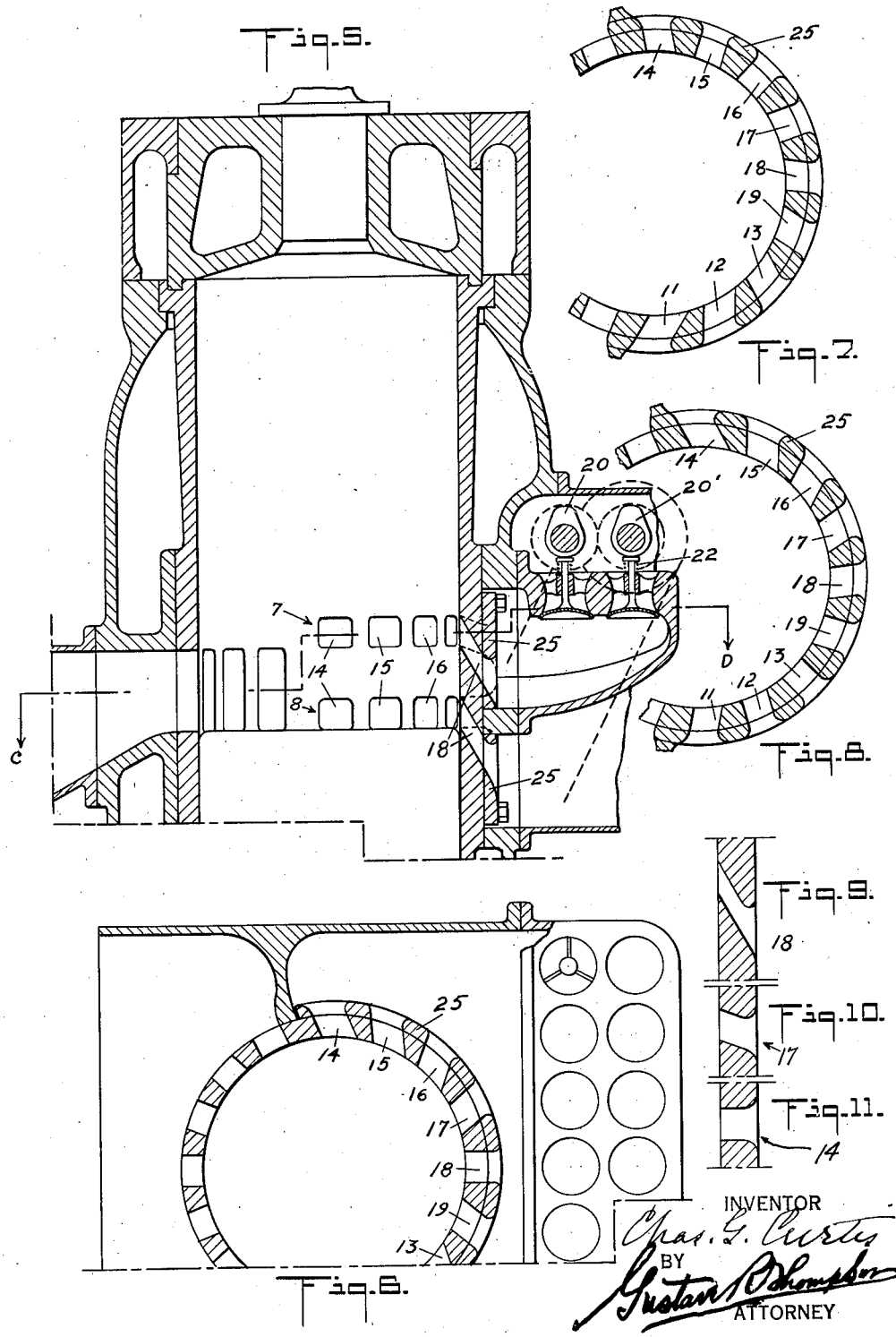

Patented Apr. 21, 1936

2,038,271

UNITED STATES PATENT OFFICE 2,038,271

TWO-CYCLE INTERNAL COMBUSTION ENGINE

Charles G. Curtis, New York, N. Y., assignor to Curtis Gas Engine Corporation, New York, N. Y., a corporation of New York Application March 3, 1933, Serial No. 659,467

4 Claims. (Cl. 123—65)

In the type of two-cycle engines which comprise combustion cylinders having two rows of scavenging air inlet ports, the upper row also serving as supercharging ports and extending above the level of the exhaust ports, it has been customary to place both rows of ports, particularly the upper row, at a sharp upward angle in order to direct the flow toward the cylinder cover in order to secure a reasonable scavenging efficiency. With that arrangement the fact that the supercharging ports are so much angled necessitates their reaching considerably above the top of the exhaust ports in order to have the necessary area for supercharging. This operates to raise the point at which compression virtually begins, or more correctly, it prolongs the time during which the cylinder is in communication with the air supply belt, and therefore increases the amount of back flow from the cylinder into the belt which results in a smaller quantity of air finally trapped in the cylinder.

For best results I have found that the top edges of the upper ports must be placed at what might be called the "optimum" position; that is, the position reached by the engine piston on its return stroke when the cylinder contains its greatest air charge after the exhaust closes. By using substantially horizontal upper air inlet ports, these ports may be placed in the optimum position without sacrificing the necessary area for supercharging. If the ports are placed below this point they will not admit the full amount of supercharging air in the time allowed. If they are placed above this point air will be pushed back into the air supply belt. It becomes very important therefore that the ports in the upper row be made as nearly horizontal as possible in order to provide sufficient area to get in the supercharge and at the same time to have the upper edges of these ports located at the optimum position in order to secure the maximum charge of air in the cylinder. My invention accomplishes this without any added complication to the mechanism, at no additional cost and with more desirable forms of inlet ports.

The object of my invention is to provide inlet ports so arranged and located that high scavenging efficiency will be obtained and at the same time both the cylinder charge and the compression ratio will be a maximum for any selected air supply pressure. It is highly important that the inlet ports be made as nearly horizontal as practicable in order to secure maximum area with minimum required height of ports.

After much experimental development I have found that it is possible to make both rows of ports or the greater portion of them horizontal or substantially horizontal without interfering with their successful cooperation so as to obtain a very high scavenging efficiency. I have found that the lower row of ports produce an upward stream which so unites with the streams from the upper row that the combined streams move up towards the cover in such a way as to produce the desired effect in giving a high scavenging efficiency. By making the upper row largely horizontal it becomes possible to increase the area available for supercharging to such an extent that the length of the effective compression stroke may be increased as much as 10 or 12 per cent in some cases, and the power of the engine increased correspondingly.

In the accompanying drawings Figure 1 is a longitudinal sectional view through the axis of the cylinder of a two-cycle engine provided with inlet ports, according to my invention.

Fig. 2 is a horizontal section through the plane (A—B) Fig. 1.

Fig. 3 is an irregular vertical section of a modification showing the inlet ports of both rows slightly inclined but not sufficiently inclined to reduce materially their effective area, and also showing the upper edges of the upper row of inlet ports at a level above the upper edges of the exhaust ports.

Fig. 4 is an irregular section similar to Fig. 3 and showing a modification in which the corresponding inlet ports in each row are horizontal and in which the upper edges of the upper row of inlet ports and of the exhaust ports are at the same level.

Fig. 5 is a longitudinal section through an engine cylinder showing a mode of constructing the port ring so as to give an increased length of directing surface, and showing another form of inlet valve either automatic or mechanically operated.

Fig. 6 is a horizontal section through the plane (C—D) Fig. 5.

Fig. 7 is a horizontal section through the upper row of ports showing a modification of the port angles designed to give a certain amount of rotary motion or turbulence to the column of air in one direction.

Fig. 8 is a horizontal section through the lower row of ports showing the angles designed to give a rotary motion or turbulence in the other direction.

Figs. 9, 10, and 11 are vertical sections through the middle port, (Fig. 5) a port adjacent to the middle port, and an end port respectively, in the upper group.

In Figure 1 numeral 5 represents the cylinder, 6 the piston of a port-scavenged two-cycle engine; 7 represents an upper row of inlet or scavenging and supercharging ports, and 8 a lower row of scavenging ports; 9 represents the exhaust ports.

I have placed the upper row so that they extend part way below and part way above the top of the exhaust ports, their height being determined by the area that is desirable for them to have. They may be placed entirely above the exhaust ports if desirable as shown in Fig. 5; that is, so that the lower edges are flush with the top of the exhaust ports, or they may be placed so that the top edges are flush with the top of the exhaust as shown in Fig. 4, or slightly above the top of the exhaust as shown in Fig. 3, each row consisting of three horizontal ports on each side, 11, 12, 13, 14, 15, and 16; and three middle ports 17, 18 and 19 which point upward. Such a port arrangement is fully described in United States Patent No. 1,780,175 dated Nov. 4, 1930. I prefer to make both rows of ports substantially alike (though they may be designed differently if desirable) and to make the bulk of these ports horizontal or substantially horizontal, the middle ports of each row being placed at a considerable angle. It has been found that this port arrangement has a very high scavening efficiency, the inclined middle ports having a comparatively small component cross the cylinder toward the exhaust ports, and having a strong upward tendency which tends to carry the column upward, so that the horizontal ports and the inclined ports together tend to produce a column which rises mainly upward on the inlet side of the cylinder and effectively reaches the cylinder head and scavenges it. The upper inlet ports are controlled by automatic valves 10, which are arranged to open when the cylinder pressure drops below the scavenging pressure but which serve to prevent a back flow of gas into the air belt when the presssure dropping part of the stroke is taking place. The side horizontal ports 11, 12, 13, 14, 15, and 16 are pointed towards the inlet side of the cylinder in accordance with the arrangement described in the patent referred to, and all the ports are directed generally toward a common center in a horizontal plane. With the lower set of ports arranged substantially like the upper rows of ports, I have found that the column of air is started upward by the lower set of ports in a substantially vertical direction, and the upper row of ports direct streams into this rising column in such a way as to augment or accelerate it, cooperating to produce a resultant column rising generally in a vertical direction largely on the inlet side. This combination produces a very high efficiency and forms a very satisfactory scavenging arrangement with ample area in the inlet ports. I have found by experimental development that this upper row of ports, as well as the lower row, can be made horizontal or substantially horizontal without impairing the efficiency and this is a matter of great importance, because the necessary area for supercharging is obtained with the top edges of the ports quite low and quite close to the top of the exhaust ports. This operates to increase the length of the compression stroke substantially and enables the top of these ports to be set at an ideal height; that is, at a height which will give the maximum supercharge in the cylinder. If these ports are set too high the pressure in the cylinder rises above the scavenging pressure before the top of the port is reached, and the result is a material back flow into the scavenging air belt with a consequent loss of pressure and of supercharge.

I have found that the ports can be inclined to a small angle in the neighborhood of 20 degrees without materially reducing their area, but the upper row of ports may be made horizontal; that is, the bulk of them horizontal as shown in Fig. 4, or both sets of ports may be made at a small inclination as shown in Fig. 3.

The optimum or best position at which to place the upper edges of the upper row will depend upon the speed of the engine, the supercharging air pressure used and other factors, and can be determined reliably only by experiment in each particular case. A sufficient amount of area for the supercharging ports must be provided so as to permit the pressure to rise as the exhaust ports are cut off, the inlet area diminishing less rapidly than the exhaust area, so that scavenging pressure in the cylinder, or nearly scavenging pressure, will be reached by the time the piston reaches the top of the upper row of ports. In engines of moderate speed the upper row can be made practically flush with, or can extend only a very short distance above the top of the exhaust ports.

In Fig. 7, which represents a horizontal section through the upper row of scavenging ports, I have arranged these ports so that the streams of air which issue from the ports on one side are slightly out of balance with those issuing from the ports on the other side of the row. This is done by directing the ports on one side more nearly towards the center of the cylinder than on the other side. The result of this arrangement will be to give to the column of air a certain amount of rotation. In engines of slow or moderate speed only a small amount of rotation or turbulence is needed to give the best combustion. I have found that this amount of turbulence can be given to the column by slightly unbalancing the streams issuing from the inlet ports on each side of the middle port of a row (by the unsymmetrical arrangement just described) without materially or seriously interfering with the scavenging efficiency. By combining with such an upper row of unsymmetrical ports a lower set of ports in which the ports on each side of the middle port are symmetrically arranged as shown in Fig. 6, the combination can be made to give very good scavenging efficiency. After the lower row is cut off and the upper row functions alone, it will give to the column a sufficient rotation or turbulence to accomplish the desired result. In this way sufficient rotation or turbulence may be obtained for ordinary conditions of operation without interfering with a high scavenging efficiency.

In higher speed machines I propose to make the lower row more or less unbalanced and the direction of rotation given by the lower row to be the reverse of that given by the upper row. With this arrangement when the two rows are functioning together (which they do during the bulk of the time scavenging is taking place) the rotation of one neutralizes the rotation of the other with the result that the column of air is caused to rise up vertically as it should do, and the result is a high scavenging efficiency. As the piston rises however and cuts off the lower set of ports, the tendency to rotate (due to the lower ports) is eliminated and the rotative effect of the upper row of ports comes into play alone during the balance of the scavenging and during the supercharging period. This admits of a very considerable degree of rotation being obtained in the column after the scavenging process is substantially completed.

In Figs. 6 and 7 I have shown an arrangement by which a comparatively thin liner carrying the ports can be used, and yet the virtual effective thickness of the liner can be made sufficient to give the necessary directing walls to the ports. I accomplish this by attaching to the liner on the inlet side a strip or portion 25, which is formed with the holes registering correctly with the port openings formed in it to match the port openings in the liner. In withdrawing the liner through the head of the cylinder, this strip or plate will first be taken off. It can be attached to the liner in any desirable way, by bolts, for example. It is made in two pieces, one for the upper row fed by the upper air belt, and another for the lower row fed from the air header.

In Figs. 5 and 6 I have shown a new form of air inlet valve which I have devised, which is very simple and very efficient; and which may be operated automatically, by suction, or may be mechanically operated by cams 20 and 21 on shafts driven from the engine shaft at the same speed as the engine. These valves I prefer to make in a form similar to a poppet valve, except that the valve itself is made in the spherical form exceedingly light and fits into a conical or spherical seat at a considerable angle (preferably about 45 degrees). These valves, being nothing more than thin metal sheets attached to very light stems, can be operated with a very considerable lift without damage to the seat, because they are so extremely light and because they are so very thin the inertia of the center of the valve and of the valve stem (where most of the weight is centered) is cushioned by the spring of the disk part of the valve itself. In other words, the only portion of the valve which is instantly arrested by contact with the seat is the portion immediately close to the seat; the center of the valve yields slightly. As the valve opens its motion is checked by a cushion applied to the stem and consisting of either a spring or equivalent cushion 22. I have also discovered by actual experiment that a great many of such valves may be grouped together and a materially increased flow obtained with a given valve lift, because of the fact that the streams of air coming together between two adjacent valves do not strike head on but come in contact at an angle, so that a group of such valves as shown in Fig. 6 will pass a very much larger amount of air with a given valve lift than if the valve disks were horizontal according to the usual practice. By making the annular valve passages at an angle, that is, so as to cause the air to issue at an angle, the interference between the streams from the different valves is very much reduced and the flow materially increased, and at the same time this type of valve may be made to operate with a greatly increased lift without damage to its seat or without objectionable noise.

What I claim as new and desire to secure by Letters Patent of the United States is:

1. In a two stroke cycle internal combustion cylinder having exhaust ports on one end of the cylinder remote from the combustion end on one side, and upper and lower rows of inlet ports on the opposite side for scavenging, the end ports in each row being directed back toward the inlet side of the cylinder and the ports in each row being arranged to give a rotational movement to the air in the cylinder in opposite directions, the air-columns from each row thus substantially neutralizing each other in producing rotation during scavenging and the upper row acting alone to produce rotation after the lower ports are closed by the piston.

2. A two stroke cycle internal combustion engine comprising a reciprocating piston, a cylinder having exhaust ports at one end thereof remote from the combustion end on one side, a row of inlet ports on the side opposite the exhaust ports for scavenging, and an upper row of inlet ports extending above the exhaust ports for super-charging, the end ports in each row being directed back toward the inlet side of the cylinder, the inlet ports of the upper row being closed by the piston after the exhaust ports are closed and having the top edges thereof located at the position of the top of the engine piston on its return stroke where the cylinder contains its greatest air charge, the inlet ports of said upper row being substantially horizontal to thereby provide a maximum port area through the cylinder wall for the height of port permissible.

3. A two stroke cycle internal combustion engine comprising a reciprocating piston, a cylinder having exhaust ports at one end thereof remote from the combustion end on one side, a row of inlet ports on the side opposite the exhaust ports for scavenging, and an upper row of inlet ports extending above the exhaust ports for super-charging, the end ports in each row being directed back toward the inlet side of the cylinder, the inlet ports of the upper row being closed by the piston after the exhaust ports are closed and having the top edges thereof located at the position of the top of the engine piston on its return stroke where the cylinder contains its greatest air charge, the inlet ports of both of said rows of inlet ports being substantially horizontal to thereby provide a maximum port area through the cylinder wall for the height of port permissible.

4. A two stroke cycle internal combustion engine comprising a reciprocating piston, a cylinder having exhaust ports at one end thereof remote from the combustion end on one side, a row of inlet ports on the side opposite the exhaust ports for scavenging, and an upper row of inlet ports extending above the exhaust ports for super-charging, the end ports in each row being directed back toward the inlet side of the cylinder, the inlet ports of the upper row being closed by the piston after the exhaust ports are closed and having the top edges thereof located at the position of the top of the engine piston on its return stroke where the cylinder contains its greatest air charge, the inlet ports of said upper row being substantially horizontal to thereby provide a maximum port area through the cylinder wall for the height of port permissible.

CHARLES G. CURTIS.